J. CHVOJKA.
VEHICLE FENDER.
APPLICATION FILED NOV. 6, 1918.

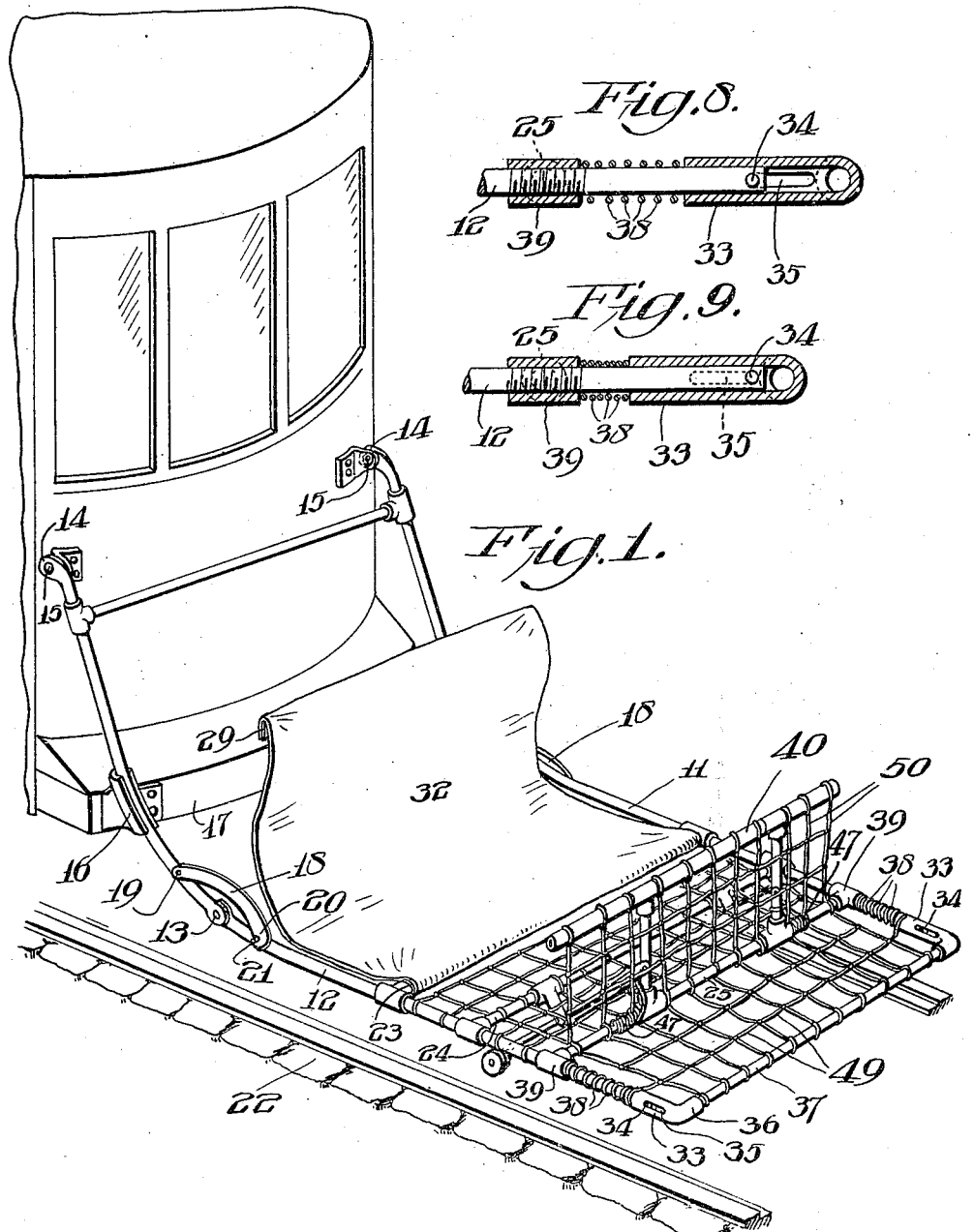

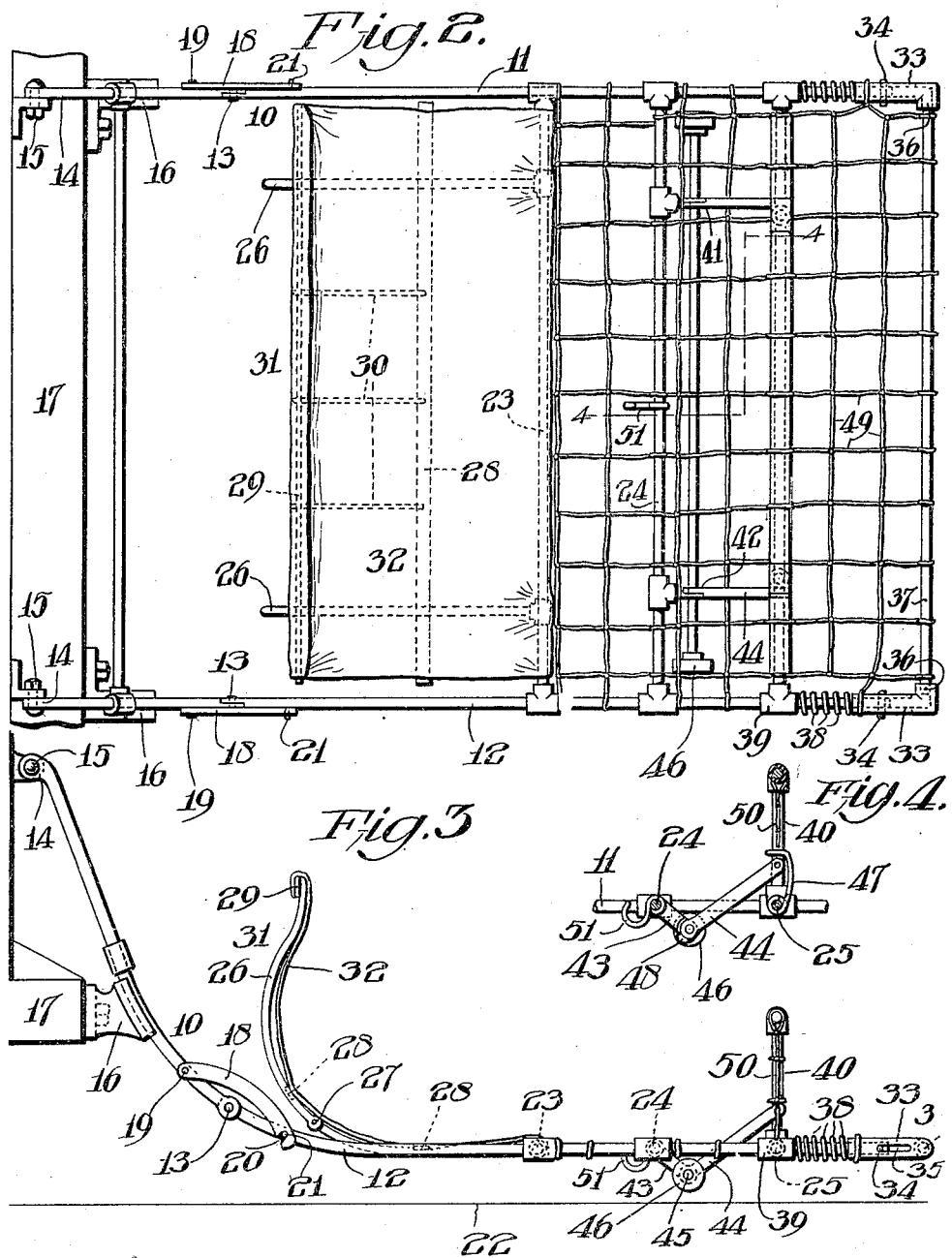

1,297,544.

Patented Mar. 18, 1919.
3 SHEETS—SHEET 3.

WITNESSES:
T. H. Randel
Augustus B. Coppes

INVENTOR
Joseph Chvojka,
BY Joshua R. H. Potts
HIS ATTORNEY

UNITED STATES PATENT OFFICE.

JOSEPH CHVOJKA, OF PHILADELPHIA, PENNSYLVANIA.

VEHICLE-FENDER.

1,297,544.      Specification of Letters Patent.      Patented Mar. 18, 1919.

Application filed November 6, 1918. Serial No. 261,331.

*To all whom it may concern:*

Be it known that I, JOSEPH CHVOJKA, a citizen of the United States, residing at Philadelphia, in the county of Philadelphia and State of Pennsylvania, have invented certain new and useful Improvements in Vehicle-Fenders, of which the following is a specification.

One object of my invention is to provide a fender for street cars or other vehicles and which will be provided with automatically operative means for retaining a person, or object struck thereby, upon the fender and thus prevent said person or object from being run over by the vehicle or being dragged along the roadway.

Another object is to provide my improved fender with means which when the fender engages a person or object will slightly elevate a portion of the fender and thereby form a relatively deep cradle or receiving pocket which will prevent the rebound of the person or object forwardly over the front end of the fender.

Another object is to make my improved fender of comparatively simple and durable construction and so that it can be folded when not desired for use and will occupy comparatively small storage space.

These objects, and other advantageous ends which will be described hereinafter, I attain in the following manner, reference being had to the accompanying drawings in which—

Figure 6:
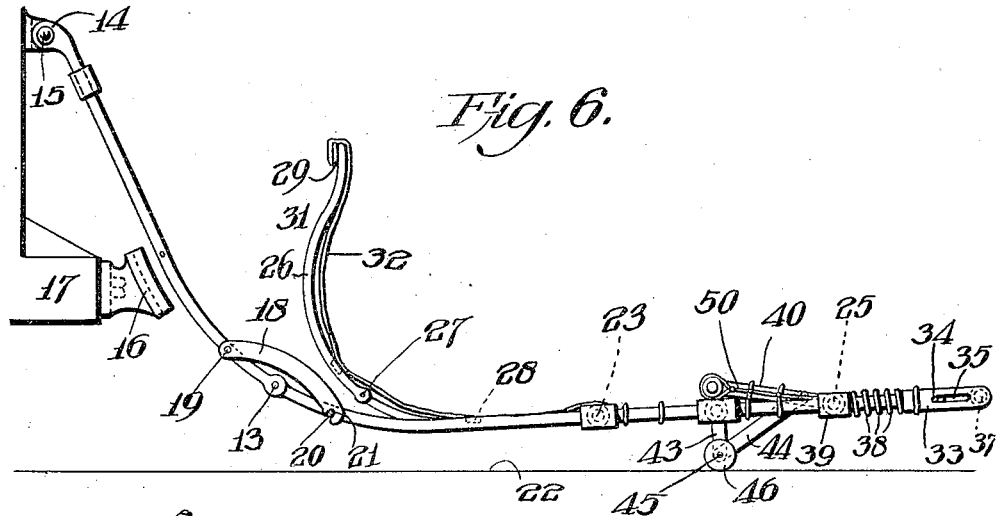
Figure 5:
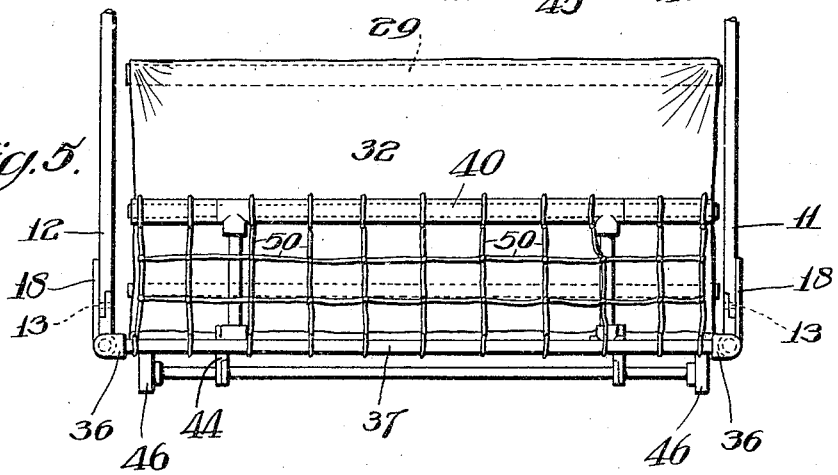
Figure 7:
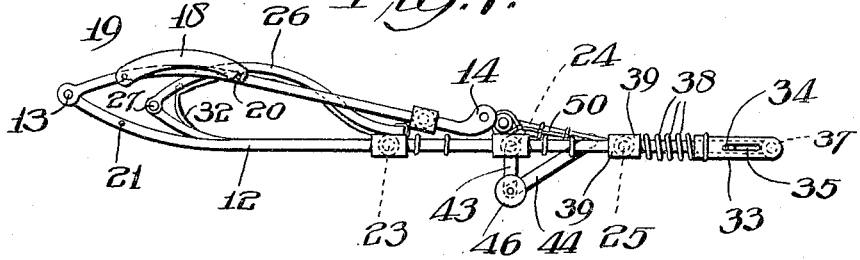

Figure 1 is a perspective view of my improved fender shown attached to a street car and when in its normal position, Fig. 2 is a top plan view of my improved fender when in its normal position, Fig. 3 is a side elevation of Fig. 2, Fig. 4 is a fragmentary section taken on the line 4—4 of Fig. 2, Fig. 5 is a front fragmentary elevation of my improved fender in its normal position, Fig. 6 is a view of similar nature to Fig. 3 showing the position of the fender when operating to catch a person or object, Fig. 7 is a side elevation of my improved fender when in its folded position, Fig. 8 is an enlarged fragmentary sectional elevation of certain of the connected parts of my improved fender, and Fig. 9 is a view of similar nature to Fig. 8 showing the parts in the position which they occupy when the fender initially engages a person or object.

Referring to the drawings, 10 represents a main frame which includes two forwardly extending main supporting bars 11 and 12 which are pivoted within their lengths as indicated at 13. The ends 14 of these bars are made in the form of eyelets which are attached to the vehicle by means of pivot bolts 15. Grooved rests 16 are adapted to be secured to the vehicle 17 and under normal conditions support the bars 11 and 12, as clearly shown in Figs. 1, 2 and 3. Retaining brackets 18 are pivotally mounted at 19 to the bars 11 and 12 to the rear of the pivots 13. These retaining brackets have notches 20 into which extend pins 21 on the bars 11 and 12 forward of the pivots 13. Thus the bars 11 and 12 are normally prevented from bending on their pivots 13 and the frame 10 is normally supported above the roadway 22.

The frame 10 includes transverse tie rods 23, 24 and 25. The tie rod 23 forms a support for two curved arms 26 which are pivoted within their lengths as shown at 27. These arms, in turn, form a support for reinforcing bars 28 and 29 to which are attached rack bars 30. A cradle rack 31 is thereby provided and this cradle rack is covered by a piece of flexible textile material 32. It will be noted that the arms 26 are rigidly secured at their lower ends to the tie rod 23 and that a sufficient portion of the cradle rack 31 is located to the rear of the pivots 27 so that the cradle rack will normally remain in the position shown in Fig. 3 and at the same time there will be a certain amount of resiliency to the cradle rack.

The forward ends of the bars 11 and 12 have sleeves 33 slidable thereon, said ends of the bars 11 and 12 being provided with pins 34 which project through slots 35 in said sleeves. The sleeves 33 have lateral extensions 36 which are bored transversely to receive the opposite ends of an impact bar 37 which normally extends parallel to the tie rod 25 and forward thereof.

Coiled springs 38 are interposed between the inner ends of the sleeves 33 and the fittings 39 which secure the tie rod 25 to the bars 11 and 12. The tension of the spring 38 normally holds the sleeves 33 in their extreme forward positions so that the rear ends of the slots 35 engage the pins 34, as clearly shown in Fig. 8.

A normally upright guard fender 40 is pivoted at its bottom on the tie rod 25. Two pairs 41 and 42 of links are provided, each of said pairs including two links 43 and 44 which are pivotally connected at 45. The links 43 are pivoted on the tie rod 24 and the links 44 are pivotally connected to the guard fender 40. The pivots 45 form bearings for wheels or rollers 46. Torsion springs 47 on the tie rod 25 engage the guard fender 40 and serve to move and hold the same in an upright position. The links 44 are provided with lugs 48 which engage the links 43 and limit the forward movement of the guard fender to an upright position, as shown in Figs. 1 to 5 inclusive, and when said guard fender is in its upright position the links 43 and 44 of each pair are angularly disposed so that a rearward movement of the guard fender 40 will cause the links 43 and 44 of each pair to be moved into a more acute angle, for example as shown in Fig. 6. This movement will move the rollers 46 downwardly with respect to the main frame 10 and cause them to engage the roadway and in so doing will slightly elevate the main frame 10. However, the axes of the rollers 46 never move directly under the axes of the links 43 with the tie rod 24 so that after the force which has moved the guard fender 40 has been released therefrom the weight of the main frame 10 and any person or object thereon will assist the springs 47 in raising the guard fender 40 to its normal or upright position.

A network 49 of flexible material covers the main frame 10 forward of the cradle rack 31 and is also secured to the impact bar 37. In the same manner the guard fender 40 includes a network 50 of similarly flexible material.

The operation of my improved fender is as follows: If a person or object is struck by the impact bar 37 of the fender the springs 38 will yield to reduce the shock and the guard fender 40 will be rocked on its pivotal support due to the engagement thereby and the person or object will fall upon the portion of the fender to the rear of the guard fender 40. The above mentioned movement of the guard fender will cause the main frame to be slightly elevated, as shown in the position in Fig. 6, and the person or object will engage the cradle rack 31. The guard fender 40 when freed will move to its upright position and thereby prevent the person or object from rebounding over the front end of the fender. Thus a person is prevented from being thrown upon the roadway by impact with the fender since it will be noted that the space between the guard fender 40 and the cradle rack 31 actually forms a pocket for retaining a person or object after being struck by the fender.

The fender can be folded in the position shown in Fig. 7 when not desired for use and I preferably provide the tie rod 24 with a hook 51 which can be moved into retaining engagement with the top of the guard fender 40 when the same is moved into its folded position. In folding the fender the retaining brackets 18 can be moved to disengage the pins 21 and the main frame can be folded on the pivots 13. The cradle rack 31 can be folded on the pivots 27 and the fender thus folded will require comparatively little storage space.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A fender structure including a main support; a cradle rack the upper portion of which curves forwardly; and a guard fender located adjacent the forward end of said main support and automatically movable into an upright position to provide a retaining pocket between it and the cradle rack, substantially as described.

2. A fender structure including a main support; a guard fender pivotally mounted adjacent the forward end of said support; an a pair of pivotally connected links respectively and pivotally connected to said main support and to said guard fender, substantially as described.

3. A fender structure including a main support; a guard fender pivotally mounted adjacent the forward end of said support; a pair of pivotally connected links respectively and pivotally connected to said main support and to said guard fender; and means carried by said links for the engagement with the roadway when the guard fender is moved on its pivot, substantially as described.

4. A fender structure including a main support; a guard fender pivotally mounted adjacent the forward end of said support; a pair of pivotally connected links respectively and pivotally connected to said main support and to said guard fender; means carried by said links for the engagement with the roadway when the guard fender is moved on its pivot; and means for automatically moving said guard fender from said latter position to an upright position, substantially as described.

5. A fender structure including a main support; a guard fender pivotally mounted adjacent the forward end of said support; a pair of pivotally connected links respectively and pivotally connected to said main support and to said guard fender; means carried by said links for the engagement with the roadway when the guard fender is moved on its pivot, said main support being made in sections pivoted together; means for pivotally mounting said main support; and means for normally locking said sections of the main support together to prevent relative pivotal movement, substantially as described.

6. A fender structure including a main support; a guard fender pivotally mounted adjacent the forward end of said support; a pair of pivotally connected links respectively and pivotally connected to said main support and to said guard fender; means carried by said links for the engagement with the roadway when the guard fender is moved on its pivot, said main support being made in sections pivoted together; means for pivotally mounting said main support; means for normally locking said sections of the main support together to prevent relative pivotal movement; and means forming a rest for the sections of said main support between their pivotal connection and the pivotal connection for said main support, substantially as described.

7. A fender structure including a main support; and a cradle rack having curved arms connected adjacent their bottoms to said main support, said rack having its upper portion curving forwardly, substantially as described.

In testimony whereof I have signed my name to this specification in the presence of two subscribing witnesses.

JOSEPH CHVOJKA.

Witnesses:
AUGUSTUS B. COPPES,
CHAS E. POTTS.

Copies of this patent may be obtained for five cents each, by addressing the "Commissioner of Patents, Washington, D. C."